United States Patent [19]

Thoma

[11] 4,226,303
[45] Oct. 7, 1980

[54] HYDRAULICAL DAMPING ELEMENT, IN PARTICULAR FOR DAMPING OF THE SWIVEL MOVEMENT OF A MOVIE OR TELEVISION CAMERA WHICH IS SECURED ON A HEAD OF A TRIPOD

[76] Inventor: Georg Thoma, Mozartstr. 14, 8021 Sauerlach, Fed. Rep. of Germany

[21] Appl. No.: 861,410

[22] Filed: Dec. 16, 1977

[30] Foreign Application Priority Data

Dec. 20, 1976 [DE] Fed. Rep. of Germany ....... 2657692

[51] Int. Cl.² ........................................... F16D 57/02
[52] U.S. Cl. .................................... 188/1 B; 354/293
[58] Field of Search .................. 188/1 B, 290; 74/574; 248/177, 178, 183, 186, 418; 354/293

[56] References Cited

U.S. PATENT DOCUMENTS

| | | | |
|---|---|---|---|
| 2,514,137 | 7/1950 | O'Connor | 188/290 |
| 2,661,915 | 12/1953 | O'Connor | 188/1 B |
| 2,882,001 | 4/1959 | Ries et al. | 248/183 |
| 3,295,639 | 1/1967 | Smith | 188/290 |
| 3,552,699 | 1/1971 | Baker | 248/183 |
| 3,651,903 | 3/1972 | Butler et al. | 188/290 |

FOREIGN PATENT DOCUMENTS 2457267 6/1976 Fed. Rep. of Germany ........... 354/293
920642 3/1963 United Kingdom .................... 188/1 B

*Primary Examiner*—Edward R. Kazenske
*Attorney, Agent, or Firm*—Blanchard, Flynn, Thiel, Boutell & Tanis

[57] ABSTRACT

A hydraulic damping element for use with tripods adapted to have camera devices mounted thereon. The damping elements include interleafed annular disks, one set thereof being secured to a hub element and another set being secured to a member radially spaced from the hub. A fluid is received between the interleafed disks so that when acceleration-type forces are applied to either the hub or the radially spaced member, the shear forces on the fluid will resist the acceleration forces so that the overall movement of one relative to the other will be smooth and continuous. A locking structure is provided to either activate or deactivate the damping elements as desired by the user thereof.

6 Claims, 5 Drawing Figures

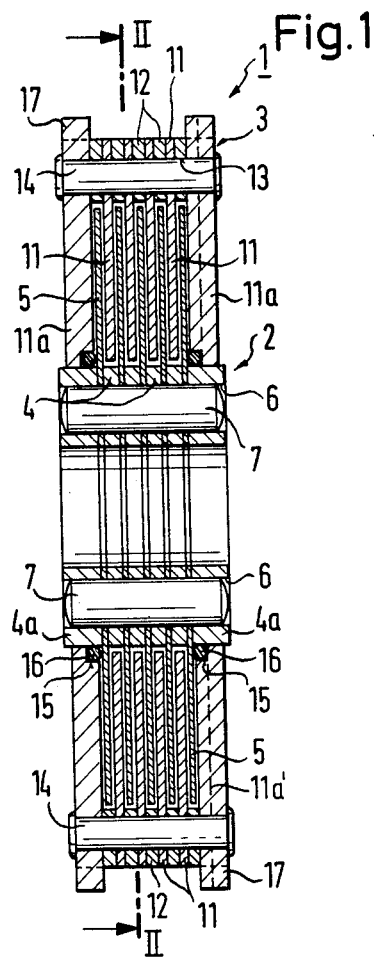
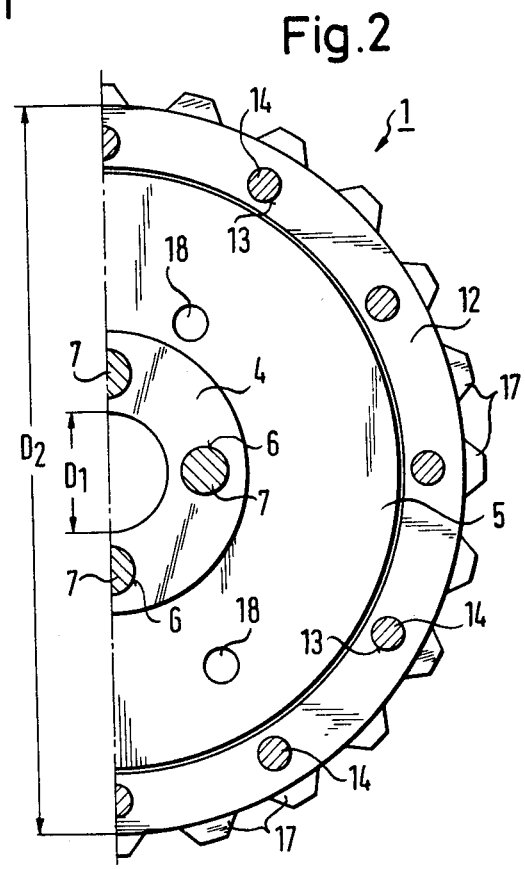
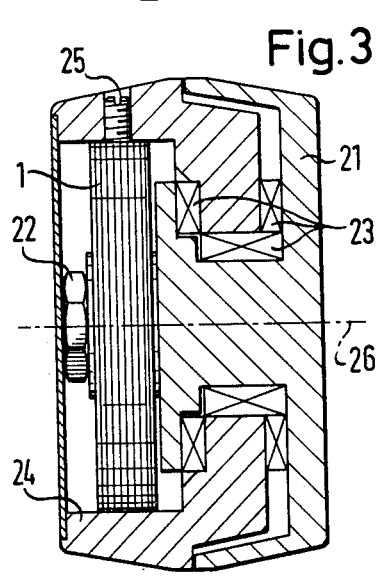
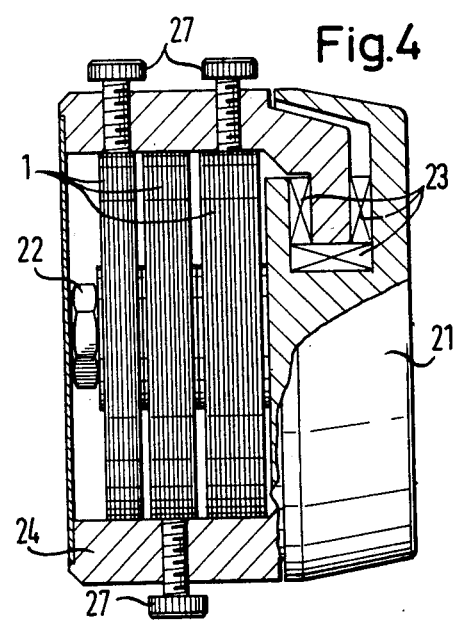

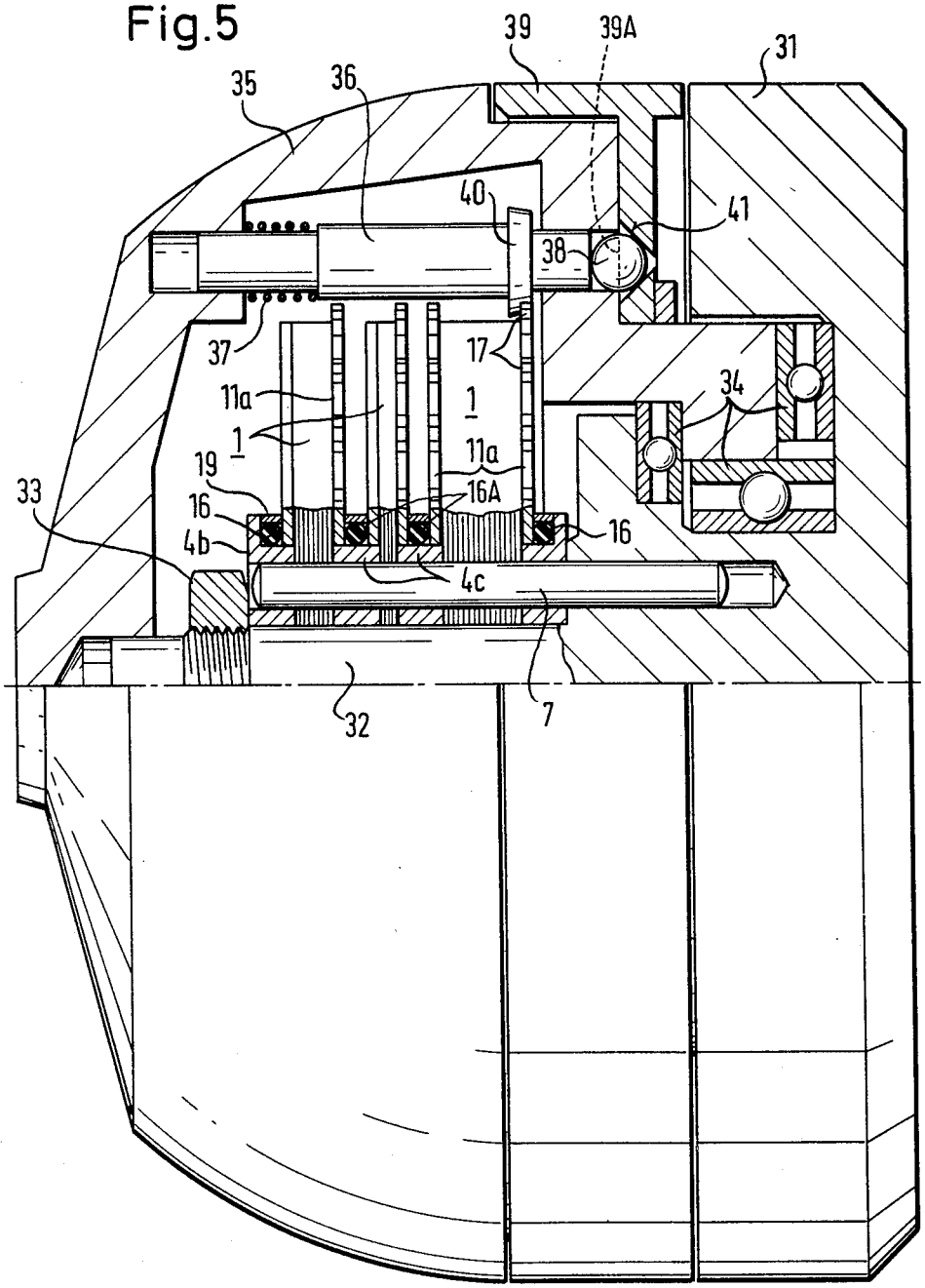

HYDRAULICAL DAMPING ELEMENT, IN PARTICULAR FOR DAMPING OF THE SWIVEL MOVEMENT OF A MOVIE OR TELEVISION CAMERA WHICH IS SECURED ON A HEAD OF A TRIPOD

FIELD OF THE INVENTION

This invention relates to a damping structure and, more particularly, to a structure for damping a rotary movement particularly in the environment of the head of a tripod adapted to have a camera device mounted thereon.

BACKGROUND OF THE INVENTION

Hydraulic damping elements are used in many fields of technology in particular where a smooth and continuous rotary movement of a shaft is important; in heads of tripods for movie and television cameras therefor hydraulic damping elements are preferred in order to be able to follow a scene with the camera evenly and controlled and in order to achieve during a showing of the developed film an optically comfortable film image without so-called vibratory motions.

The damping elements which are considered here have two sets of damping elements interleafed comblike and having surface gaps therebetween filled with a damping fluid. The one set of damping elements is connected rigid against rotation to the shaft about which the rotary movement occurs, while the second set is yieldingly held and causes, during a rotary movement of the two sets relative to one another, the creation of shearing forces through adhesion in the surface gaps which are opposite the rotary movement to dampen and sudden acceleration forces.

Such hydraulic damping elements can therefore only be used in connection with heavy tripods which are bulky to transport, as they are used substantially only by professional movie makers in connection with heavy movie and television cameras. Movie amateurs, however, which usually use much lighter and more handy cameras, hesitate to buy them because of the mentioned difficulties in handling the heavy hydraulically damped tripods, even if they take a lot of movies and know of the advantages of these tripods.

As damping elements, annular disks (German OS No. 24 57 267 or U.S. Pat. No. 2,514,137) or annular cores (compare German Pat. No. 1 937 011) are used.

The known damping elements have each a separate housing which in most cases is composed of castings and is filled with a damping fluid, in which housing the shaft and the two sets of damping elements are arranged. The second set of damping elements is locked either entirely in the housing (compare U.S. Pat. No. 2,514,137) or, however, there exists the possibility to lock only individual damping elements selectively with the housing to cause different damping forces to be achievable; compare German OS No. 24 57 267 and German Patent No. 19 37 011.

The mentioned construction of a damping element with a housing which is composed of castings brings about that the entire damping element is heavy and bulky. In particular in the case of heads of tripods for movie and television cameras this has the consequence that also the tripod which carries the head must be designed accordingly massive in order to assure a clearance-free and blurfree swivelling of the camera.

In addition, the manufacture and the assembly of known damping elements, possibly in connection with heads of tripods, is complicated and expensive, even if partly it has been tried to use premanufactured parts with the same dimensions; thus according to German OS No. 24 57 267 the annular disks which serve as damping elements and the spacers, which assure the spacing between the annular disks, are punched of sheet metal. In spite of this simplification, the assembly of the damping element must, however, be generally done manually; thus a head of a tripod with adjustable damping force is for example successively built of the individual parts of the damping element and the housing and operations are needed which cannot be automated. Also the utilization of smaller tool machines, which serve only to support the manual operations, thus assembly and screwing together of the individual parts, is only possible in a limited scope.

Because of the high manufacturing expenses, such damping elements are naturally expensive. In the case of hydraulically damped heads of tripods, this leads to these being sold only in limited numbers and substantially again only to professional film makers, since the purchase is only economical for these professional circles. However, the price for such heads of tripods is in relationship to the intended use too high for movie amateurs.

The basic purpose of the invention is to newly design the construction of a hydraulic damping element and to substantially simplify same. Particularly the damping element is to be composed of parts which permit a simple and thus inexpensive manufacture and it is possible to also use more tool machines; furthermore the building size of the damping element is to be reduced.

Contrary to known damping elements, a damping element according to the invention is constructed as a separate closed unit, which can be manufactured independent from the device which must be connected to the damping element, for example a head of a tripod or a housing which receives it. Due to the fact that the damping element is first built as a structural unit without its own separate housing, the operating steps are cancelled which had been necessary up to now for the described successive assembly of the housing with the individual damping elements. The finished package-shaped damping element is now moved with its hub onto the shaft, is fixed with same and in this manner for example connected to the head of the tripod.

The damping element can be manufactured in an organized and inexpensive manner, particularly when the damping elements are annular disks. The first subunit is hereby composed alternately of annular disk-shaped spacers and annular disks with the same hole diameter, while the second subunit is composed alternately of annular disks and annular disk-shaped spacers which are connected to said annular disks and which have each the same outside diameter.

At least the two outer annular disks of the second subunit, which annular disks define the damping element, are supported on spacers of the first subunit and sealing means, for example 0-rings, are provided for sealing off the first subunit with respect to these outer annular disks of the second subunit. In the case of such a construction, thus the sealing disks and the annular disks of the first subunit form with their equal hold diameters the hub, while the annular disks of the second set are interleafed between the annular disks of the first subunit. At least the two outer annular disks of the second subunit slide on the corresponding spacers of the first subunit, thus have an inside diameter which corresponds to the outside diameter of the spacers. To seal off the damping element, preferably O-rings are arranged between outer annular disks and associated spacers.

One damping element according to the invention consists of a structural unit defined only by the annular disks which contribute to the damping and the spacers, and the two O-rings for sealing. It can be seen that with such a construction, a very compact structure is achieved, in which also very thin sheet metal can be used for the annular disks and spacers, without that the mechanical rigidity of the entire damping package would be lessened. In spite of a structural size which is substantially reduced compared with known damping elements, very high damping forces can be achieved.

An important advantage of such a damping elements lies in the possibility of substantially automating and speeding up the manufacture by using tool machines. Annular disks and spacers are first punched from sheet metal; then alternately spacers and annular disks of the first subunit and the corresponding parts of the second subunit are placed one on top of the other and are each coated with damping liquid. In the outer annular disks, the O-ring is inserted in addition. The thus formed package is compressed and the excessive damping liquid exits from the gaps between the spacers and annular disks; subsequently the annular disks and the spacers of the outer subunit which supports the second set of the annular disks are connected, for example by riveting; through this the entire package is held together. The first subunit, consisting of the suitable spacers and annular disks need in this case be connected only lightly, for example by pinning, to secure the individual parts against rotation.

The entire manufacture of the damping element requires only a fraction of the time heretofore used for manual assembly of a damping element in a housing; the manufacture of a head of a tripod with such a damping element is less expensive; if the heretofore assembly of the entire head took place successively of parts of the head of the tripod and the damping element, which caused a so-called intermeshed and interdependent manufacture of the head of the tripod and of the damping head, then now it is possible to assemble very simply a head of a tripod from the already finished damping element and the prepared housing of the head in a few operating steps.

The hub of the damping element preferably projects slightly beyond the second subunit which is supported on same, namely in a construction with annular disks the outer spacers of the first subunit project slightly beyond the two outer annular disks of the second subunit which define the damping element. As a result, the damping element which is constructed as a package fixed to the shaft by a press fit, so that the freedom of movement of the second subunit and therewith also the two outer annular disks are not affected. In addition, it is also possible to provide the hub of the damping element, namely the spacers and annular disks of the first subunit, with teeth which correspond with the shaft; thus a clearance-free fit which is necessary for a smooth damping of the rotary movement is assured.

According to an advantageous application of the invention, several such package-shaped damping elements can be moved on the shaft and can be connected rigid against rotation to same; through a locking mechanism, as it can be taken over in principle approximately from German OS No. 24 57 267, the damping elements can be selectively held on their periphery, namely the respectively second subunits of the individual damping elements, so that in a very simple manner it is possible to vary the damping factor. Such a damping element with a selectable adjustment of the damping factor is structurally much simpler than known damping elements, because the entire locking mechanism is arranged outside of the damping elements because of the package-shaped closed structure of the individual damping elements.

In known damping elements, care had to be taken, either through particularly precise manufacture or through separate sealing means, to assure that the operating levers for locking the individual damping elements are guided leakage-free from the housing; these problems do not at all occur in an adjustable damping element according to the invention.

Also damping elements with a variable damping factor can be manufactured simply and with many possibilities of adjustment. Thus it is possible to achieve eight progressive damping stages approximately through three package-shaped damping elements, the number of which can be selectively adjusted correspondingly to one another to assure that the manufacture expense for the entire unit is not substantially increased. Since in the package-shaped damping elements according to the invention, the damping elements can be punched from very thin sheet metal, a compact device having a high damping factor can be achieved.

Since damping elements can be manufactured with the given construction at a small and favorable price, it is here also possible to manufacture hydraulically damped heads of tripods substantially less expensively and to couple same with light and handy tripods, as they are used by movie amateurs.

BRIEF DESCRIPTION OF THE DRAWINGS

The invention is discussed more in detail in several examplary embodiments with reference to the drawings, in which:

FIG. 1 is a cross-sectional view of a damping element embodying the invention;

FIG. 2 is a sectional view taken along the line II—II of FIG. 1;

FIG. 3 is a cross-sectional view of a light hydraulically damped head of a tripod for a movie or television camera having a damping element embodying the invention;

FIG. 4 is a cross-sectional view of a light head of a tripod for a camera, which is provided with three selective lockable damping elements embodying the invention; and FIG. 5 is a cross-sectional view of a head of a tripod for heavy cameras having three damping elements embodying the invention, each of which can be selectively locked through a center control.

DETAILED DESCRIPTION

A damping element 1 is composed of a first subunit 2 and a second subunit 3. The first subunit 2 consists of alternatingly spaced annular disk-shaped spacers 4 and annular disks 5, both having the same inside diameter D1. The two outer spacers 4a are slightly thicker than the others. The spacers 4 and the annular disks 5 have several aligned openings 6 therein; pins 7 are arranged in some openings, which pins hold the spacers 4 and annular disks 5 together. The finished subunit 2 can be mounted on a hub having a diameter D1 and supports the annular disks 5 which project radially outwardly from the spacers 4.

Interleafed or comblike annular disks 11 of the second subunit 3 are received in the spaces between the annular disks 5 of the first subunit 2 determined by the thickness of the spacers 4, between which in turn are arranged annular disk-shaped spacers 12 having an outside diameter D2 which corresponds to the outside diameter of the annular disks 11.

The annular disks and spacers 11 and 12 of the second subunit 2 are provided with several openings 13 therein which are distributed around the periphery thereof, in which openings rivets 14 are arranged for holding the subunit 3 together. The two endmost annular disks 11a of the second subunit 3 are thicker than the other annular disks and have a central hole diameter corresponding approximately with the outside diameter of the spacers 4; they are supported on the outer spacers 4a of the first subunit 2 similar to a bushing and have a recess 15 in the side thereof facing the inside of the damping element 1, in which recess is received an O-ring 16 for sealing off the damping element.

The outer annular disks 11a may have teeth 17 which project beyond the outer diameter of the other annular disks and spacers 11 and 12 and are advantageously formed slightly conical, which teeth can be used for locking the damping element, as is discussed in FIG. 5. The entire inside of the damping element is filled with a damping fluid, for example silicone oil. The inner annular disks 5 and 11 have also punched holes 18 therein for facilitating a circulation of the damping fluid in the structural unit when the first and second subunits are rotated relative to one another around the common axis of rotation.

The annular disks 5 and 11 of the first and second subunits 2 and 3, respectively, can be punched out of sheet metal, for example with a thickness of 0.5 mm. However, in the case of annular disks having this thickness, it is not possible to provide the annular disks 11a which serve as outer cover disks of the second subunit 3 with a recess 15 for receiving the O-ring 16 therein. Therefore, these cover disks must be punched either out of thicker sheet metals, into which then the recess 15 for receiving the O-ring is milled; however, it is also possible to compose the two outer annular disks 11a, as this is indicated by dashes 11a' in FIG. 1 of two annular disks and the annular disks which face the inside of the damping member has a larger hole diameter, so that the O-ring can be inserted in the thus formed recess for sealing off the damping element. It is furthermore possible to arrange the O-ring not inside of the damping element, but on the outside on the annular disks 11a, as this is indicated schematically in FIG. 5.

The axial endmost spacers of the first subunit 2 (FIG. 5) are each constructed as elements 4b having an L-shaped cross section and the O-ring is inserted in the space between the outer annular disk 11a and the leg of the spacer which is parallel to it and is secured, if necessary, with an annular sleeve 19. Of course, other structural possibilities for sealing off the damping element are conceivable.

To manufacture the described damping element, all individual parts are placed one on top of the other with the openings 6 and 13 in alignment; accordingly, one after the other spacers 4 of the inventive subunit 2, thereafter annular disks 11 of the second subunit 3, thereafter a spacer 12 of the second subunit 3 and an annular disk 5 of the first subunit 2 and so on are stacked one on top of the other and the individual parts are each coated with damping fluid and in the outer annular disks 11a of the second subunit 3, which annular disks serve as cover disks for the damping element, the O-ring 16 is inserted. Thereafter the entire structural unit is compressed perpendicularly to the surface of the annular disks and any excessive damping fluid is urged outwardly through the respective gap between annular disks and spacers both of the first and also of the second subunits. When the spacers and the annular disks of each subunit abut one another without any space therebetween, the annular disks 11 and the spacers 12 of the second subunit 3 are fixedly connected with one another through the aligning openings 9 by means of the rivets 14.

In addition, the spacers 4 and the annular disks 5 of the first subunit 2 are connected in the openings 6 by the pins 7, even though they are already fixed by the second subunit 3.

After these described operating steps, which can substantially be automated, the manufacture of the packagelike damping element is concluded.

In the case of a light hydraulically damped head on a tripod having a fixedly adjusted damping factor, the finished structural unit is mounted on a shaft of the head of the tripod, which shaft projects axially from a first turned part 21 and is rigidly connected against rotation relative to the first turned part 21; compare FIG. 3. For this an adjusting nut 22 is used; in addition the pins 7 which hold the first subunit together can also engage said turned part 21, so that an absolutely clearance-free connection between the shaft and damping element 1 is assured. In the first turned part, which is connected to a receiving device (not show) on a light amateur camera, a second turned part 24 is supported by means of several bearings 23. The turned part 24 is connected in turn to the tripod which is also not shown. The second turned part grips around the damping element and the damping element is held by means of one or several screws 25 to the second turned part at its periphery.

The two turned parts 21 and 24 of the head of the tripod can now be pivoted about the common axis of rotation 26 with the damping function provided by the damping element 1.

FIG. 4 shows the head of a light hydraulically damped tripod, the damping factor of which can be varied.

The head of the tripod, which again consists of two turned parts 21 and 24 and is otherwise constructed much like the head illustrated in FIG. 3, has three damping elements 1 with a different number of annular disks. To lock the individual damping elements, setscrews 27 are provided in the second turned part 24 so that the respective damping elements can be locked at their periphery. Depending on which and how many damping elements are secured by the setscrews 27, the magnitude of the damping factor for the swivel movements of the head of the tripod can be varied. As can easily be understood, it is possible with this construction to adjust eight different damping degrees, if one counts the damping degree zero, namely a nondamped swivel movement.

FIG. 5 illustrates a head of a tripod for a heavy camera, the damping factor of which can be varied with three damping elements 1. The head consists of a first turned part 31 connected to the receiving device (not shown) on the camera and has a shaft 32 thereon. Three damping elements are mounted on the shaft 32, which elements are here, as described in connection with FIG. 1 above, each sealed off by outer O-rings 16. Only one O-ring 16a each is provided between the individual damping elements, which O-ring is supported on a spacer 4c which is associated with two mutually adjacent damping elements and is constructed as a sleeve and is clamped between the outer annular disks 11a of the mutually adjacent damping elements. The premanufactured unit of three damping elements is mounted onto the shaft 32 and is secured by an adjusting nut 33. The pins 7 which connect the damping elements with one another are received in corresponding openings in the turned part 31 parallel to the shaft 32 in order to achieve a connection which is rigid against rotation between the damping elements and the shaft.

The damping elements have, as is described with reference to FIG. 1, outer annular disks with teeth 17 thereon.

A second turned part 35 is rotatably supported through several bearings 34 in the first turned part 31, which second turned part 35 encloses the damping elements like a bowl. A guide pin 36 is supported longitudinally movably in the bowl parallel to the shaft 32 for each damping part. Each of the guide pins is urged under the effect of a pressure spring 37 into engagement with a ball 38 resting on the flat surface portion 39A of a center control member 39 and which in turn is arranged between the two turned parts 31 and 35 and can be rotated about the axis of rotation of the shaft 32, which axis is common to all turned parts. Each guide pin 36 has a conical locking element 40 thereon, the conical outer surface of which is adjusted to the conical teeth 17 of the edge disks of the damping elements. As long as the balls 38 are resting on the surface 39A of the control member 39, the locking elements 40 do not engage the teeth 17.

The surface 39A of the control member 39 has at certain points conical recesses therein which serve as control cams 41 and into which the balls 38 move under the force of the spring 37 at a certain position of rotation of the control member and the respective guide pin 36 is moved to the right viewed in FIG. 5 such that the locking element 40 engages the teeth 17 of the associated damping element; this is shown in FIG. 5 for the rightmost damping element 1. Due to the conicity of the locking elements and the teeth, the locking element and the teeth contact one another in the locked condition at the conical surface which is common to both, so that a very good line or surface contact results which additionally is self-adjusting due to the aforementioned conicity. The recesses 41 are angularly distributed on the circular annular surface of the control member such that depending on the position of rotation of the control member, an adjustment of the three damping elements having different damping factors is possible.

Through eight different positions of rotation of the control member 39, there can be adjusted, similar to the exemplary embodiment according to FIG. 4, also eight different degrees of damping.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which are exclusive property or privilege is claimed are defined as follows:

1. A tripod head for a television or film camera including a rotatable receiving device for the camera, a shaft connected to the receiving device, a fixed stator including bearing means rotatably supporting said receiving device, and a hydraulic damping element interposed between rotatable device and stator, the damping element comprising a self-contained independent unit incorporating two subunits, the first subunit being composed of alternating, abutting annular disk-shaped spacers and damping disks all having the same hole diameter with outer ones of said spacers forming the outer ends of said first subunit, the second subunit being composed of alternating, abutting annular disk-shaped damping disks and spacers all having the same outside diameter with outer ones of said damping disks forming the outer ends of said second subunit, the damping disks of the two subunits being interfingered with one another in a comblike manner, the two outer damping disks of the second subunit being slidable in friction bearing relation on the outer spacers of the first subunit, and including a seal therebetween at the friction bearing interface, and damping fluid contained in the thus-sealed damping element;

means mounting the damping element as a unit on said head and including means rigidly fixing said first subunit for rotation with said shaft and locking means for locking said second subunit in a fixed position with respect to said stator during the rotary movement of said shaft, said rigidly fixing means including an elongate pin extending through eccentrically located axial openings in said spacers and damping disks of said first subunit and then into an eccentrically located axial hole in said rotatable device, said locking means comprising teeth on one of said outer ones of said damping disks of said second subunit and means on said stator selectively interengageable therewith, said second subunit including eccentrically located axially extending means locking together said spacers and damping disks of said second subunit and free of connection to said stator means.

2. The tripod head according to claim 1, including means cooperable with said shaft for pressing the spacers and the damping disks of the first subunit perpendicularly of the surface of the damping disks along the axis of rotation of the damping element.

3. The tripod head according to claim 1, in which the seals are O-rings.

4. The tripod head according to claim 1, wherein several said damping elements are mounted on the shaft with their first subunits connected rigidly for rotation with the shaft by said elongate pin, and their second subunits selectively locked, damping element by damping element, by said locking means.

5. The tripod head according to claim 4, wherein the individual damping elements have different numbers of damping disks therein.

6. The tripod head according to claim 5, including sealing means supported between the individual damping elements mounted on the shaft.

* * * * *

UNITED STATES PATENT OFFICE
CERTIFICATE OF CORRECTION

Patent No. 4 226 303              Dated  October 7, 1980

Inventor(s) Georg Thoma

It is certified that error appears in the above-identified patent and that said Letters Patent are hereby corrected as shown below:

First word in title; change "HYDRAULICAL" to ---HYDRAULIC---.

Col. 8, line 11; after "between" insert ---said---.

Signed and Sealed this

Twenty-fourth Day of February 1981

[SEAL]

Attest:

RENE D. TEGTMEYER

Attesting Officer     Acting Commissioner of Patents and Trademarks